2,958,685
POLYMERS OF PERFLUOROPROPYLENE

Herbert Sousa Eleuterio, Wilmington, Del., assignor to E. I. du Pont de Nemours and Company, Wilmington, Del., a corporation of Delaware No Drawing. Filed Aug. 9, 1957, Ser. No. 677,212

7 Claims. (Cl. 260—92.1)

The present invention relates to the polymerization of perfluoropropylene and more particularly to the polymerization of perfluoropropylene to high molecular weight resins useful as plastics.

It was believed heretofore (R. M. Adams and F. A. Bovey, vol. 9, Journal of Polymer Science, pp. 481–492, 1952) that perfluoropropylene could not be homopolymerized to give a high molecular weight resin suitable for plastic applications. Low molecular weight liquid and waxy polymers of perfluoropropylene have been obtained by a thermal synthesis of telomers of perfluoropropylene followed by the removal of part of the telogen to obtain a low molecular weight polymer (M. Hauptschein et al., vol. 79, Journal of the American Chemical Society, p. 2549, 1957). The preparation of high molecular weight polymers through addition polymerization of perfluoropropylene by methods which have heretofore been employed for monomers of similar structure such as tetrafluoroethylene has not been accomplished heretofore and has, in general, been believed not to be possible.

It is the object of the present invention to provide a tough, high molecular weight polymer of perfluoropropylene suitable for melt fabrication and a method for its preparation.

In accordance with the present invention a high molecular weight polymer of perfluoropropylene is obtained by polymerizing perfluoropropylene with a highly fluorinated initiator at a temperature of 0° to 300° C. and a pressure of at least 1000 atmospheres. In preferred embodiments of the present invention the polymerization is carried out in an inert liquid medium at elevated temperatures above 200° C. employing a free radical forming initiator.

Polyperfluoropropylene is a solid, amorphous polymer which has a softening point at a temperature above 225° C. The softening point of the polymer is determined by moving a sample of the polymer under slight pressure across the surface of a heated metal block, such as a standard Maquenne block, and determining the temperature at which the polymer leaves a wet molten trail. This temperature is considered to be the softening point or the stick temperature of the polymer. Polyperfluoropropylene of the present invention is furthermore a polymer of outstanding mechanical properties. It may be drawn, at least 4 times its original length and is thereby oriented. The polyperfluoropropylene of the present invention is furthermore a tough polymer. The toughness of the polymer, generally a function of molecular weight in linear polymers, distinguishes low molecular weight waxy and glass-like solids from high molecular weight polymer of a thickness of 3 to 7 mils by compression measured by various techniques. A simple and rigorous test of toughness, employed herein is a film toughness. Film toughness is measured by preparing a film of the polymers suitable for plastics application. It may be molding of the polymer at temperatures above its stick temperature, i.e., 250° C. and above, folding the polymer film through a 180° angle, creasing the film and then folding the film back on itself through a 360° angle and again creasing the film. The polymer is considered tough if on straightening out the molded film sample tested shows no break or crack. Polyperfluoropropylene of the present invention may be repeatedly creased and flexed through a 360° angle without cracking. In contrast to polytetrafluoroethylene, polyperfluoropropylene is readily suitable for melt fabrication such as injection molding, compression molding, and extrusion at temperatures above the softening point range of the polymer. The melt fabricability of polyperfluoropropylene is readily shown by heating the polymer to above the softening point and drawing the melt into a monofilament; molten polyperfluoropropylene can be drawn at least 10 times to give oriented fibers. Polyperfluoropropylene further differs from polytetrafluoroethylene in its mechanical properties and particularly in its rigidity as measured by Tinius Olsen stiffness for example; thus polyperfluoropropylene was found to have an average room temperature stiffness of about 187,000 p.s.i. as compared to an average stiffness for polytetrafluoroethylene of about 61,000 p.s.i. measured by the same ASTM D747 test method. Polyperfluoropropylene was also found to have a surprising retention of mechanical properties at elevated temperatures. Thus at 90° C. the average stiffness of the polymer is 154,000 p.s.i. indicating a retention of 82.5% of the room temperature stiffness of the polymer. In contrast to polytetrafluoroethylene, which is insoluble in fluorocarbon solvents at room temperature, dilute solutions (0.5%) of polyperfluoropropylene can be prepared in perfluorinated solvents.

Perfluoropropylene, also referred to as hexafluoropropylene, has the general formula $CF_3CF=CF_2$ and can be prepared by pyrolysis of tetrafluoroethylene, polytetrafluoroethylene and other methods which have been described in the literature.

The polymerization of perfluoropropylene to form high molecular weight polymers is carried out at perfluoropropylene pressures of at least 1000 atmospheres and preferably at pressures of 2000 to 10,000 atmospheres. The inert solvents when employed in the polymerization of perfluoropropylene are inert perfluorinated solvents, liquid at polymerization conditions, such as perfluorocyclohexane, perfluoroheptane, perfluorocyclobutane, perfluoro-1,3-dimethyl cyclobutane, etc. Perfluoropropylene may also be polymerized in bulk in the absence of a polymerization medium. The initiator employed in the present invention is a highly fluorinated free radical initiator capable of forming free radicals under polymerization conditions. It is essential that the catalyst employed does not contain hydrogen bonded to carbon, since such hydrogen is capable of independently reacting with the perfluoropropylene and thereby inhibits the polymerization of perfluoropropylene. Suitable catalysts are bis-sulfides such as bis-trifluoromethyl disulfide, metal perfluoroalkyls such as pentafluorodiethyl mercury and metal salts of polyvalent metals having a higher unstable valence state with perfluorinated acids and mercaptans such as lead tetraperfluorocarboxylates and mercury diperfluoroalkyl mercaptides. The lead tetrafluorocarboxylates are obtained by reacting in a moisture-free inert atmosphere stoichiometric quantities of tetravalent lead oxide with a perfluorinated acid employing as a reaction medium and desiccant the corresponding perfluorinated acid anhydride. The resulting solution of the tetravalent lead salt may be directly employed in the polymerization. The quantity of the catalyst may vary from 0.001 to 10% by weight of the monomer, but is preferably in the range of 0.001 to 1%. It is essential that the polymerization be carried out in the absence of water and oxygen which are capable of reacting with the catalyst.

The invention is further illustrated by the following examples:

Example I

Into a 200 ml. stainless steel autoclave was charged 75 ml. of perfluoro-1,3-dimethyl cyclobutane and 0.2 g. of mercury bis-trifluoromethylmercaptide. The reaction mixture was heated to 225° C. and pressured with hexafluoropropylene to 3000 atmospheres. The reaction mixture was agitated for a period of 14 hrs. at that temperature and pressure. The reaction vessel was then cooled to room temperature, and excess monomer was then vented off. On filtering the reaction mixture, 50 g. of a solid, white polyperfluoropropylene was obtained. The polymer was found to have a softening point in the range of 225° to 250° C. A sample of the polymer was molded into transparent, tough, flexible films by pressing the polymer at 250° C. for 2 minutes at a pressure of 20,000 pounds. X-ray analysis of the film indicated the polymer to be amorphous. The film could be oriented by drawing at a temperature below the softening range. The polymer could be drawn into monofilaments by heating a sample to 250° C. and drawing it. The average Tinius Olsen stiffness of the polymer was found to be 187,000 p.s.i. at room temperature employing compression molded samples and measuring the stiffness according to the method described in ASTM D-747.

Example II

Employing the procedure of Example I, except that bistrifluoromethyl disulfide was substituted for the mercury bistrifluoromethyl mercaptide, 42 g. of solid high molecular weight polyperfluoropropylene was obtained.

Example III

Into a 200 ml. stainless steel autoclave was charged 40 ml. of perfluoro-1,3-dimethylcyclobutane and 1 g. of a solution prepared by admixing 8.6 g. of red lead oxide, 30 g. trifluoroacetic acid and 12 g. of trifluoroacetic anhydride. The reaction mixture was heated to 95° C. and pressured to 3000 atm. with perfluoropropylene. The autoclave was agitated for 14 hrs. while maintaining temperature and pressure. On cooling the vessel to room temperature and removing excess monomer, a solid polymer of perfluoropropylene having essentially the same properties as described in Example I was isolated by filtration.

Solid polyperfluoropropylene as prepared by the present invention is a highly valuable fluorocarbon resin. Its properties due to its chemical structure are in many ways similar to those of polytetrafluoroethylene. Thus this novel polymer has outstanding corrosion resistance, weatherability, and dielectric properties. The high stiffness of the polymer and the retention of stiffness at elevated temperatures indicates outstanding mechanical properties. The polymer can be compression molded into articles and films. Polyperfluoropropylene is useful as a fiber-forming polymer since it can be oriented by drawing. The properties of the polymer are greatly improved by such drawing. Since polyperfluoropropylene is soluble in perfluorinated solvents, solutions thereof may be suitably employed for coating and impregnation purposes.

I claim:

1. Normally solid homopolymer of perfluoropropylene having a softening point temperature of 225° C. to 250° C., said polyperfluoropropylene being capable of being compression molded at a temperature above 250° C. into flexible films capable of being repeatedly creased and flexed through an angle of 360°.

2. A process for homopolymerizing perfluoropropylene which comprises contacting perfluoropropylene at a pressure of 2000 to 10,000 atmospheres, in the substantial absence of moisture and oxygen, at a temperature of 200 to 300° C., with an inert, saturated perfluorocarbon solvent having therein dissolved a perfluorinated free radical initiator, and recovering a solid polymer of perfluoropropylene.

3. The process as set forth in claim 2 wherein the perfluorinated initiator is mercury diperfluoromethyl mercaptide.

4. The process as set forth in claim 2 wherein the perfluorinated initiator is lead tetratrifluoroacetate.

5. The process as set forth in claim 2 wherein the perfluorinated solvent is perfluoro-1,3-dimethyl cyclobutane.

6. Normally solid polyperfluoropropylene of claim 1 in film form.

7. Normally solid polyperfluoropropylene of claim 1 in fiber form.

References Cited in the file of this patent

UNITED STATES PATENTS

| | | |
|---|---|---|
| 2,626,254 | Miller et al. | Jan. 20, 1953 |
| 2,636,908 | Dittman et al. | Apr. 28, 1953 |
| 2,751,376 | Barnhart et al. | June 19, 1956 |

OTHER REFERENCES

Adams et al.: Journal of Polymer Science, 9, 481–492 (1952).

Hauptschein et al.: J. Amer. Chem. Soc., 79, 2549 (1957).

UNITED STATES PATENT OFFICE
CERTIFICATE OF CORRECTION

Patent No. 2,958,685 November 1, 1960

Herbert Sousa Eleuterio

It is hereby certified that error appears in the printed specification of the above numbered patent requiring correction and that the said Letters Patent should read as corrected below.

Column 1, line 66, beginning with "polymer of a thickness" strike out all to and including "may be" in line 70, and insert instead -- polymers suitable for plastics application. It may be measured by various techniques. A simple and rigorous test of toughness, employed herein is a film toughness. Film toughness is measured by preparing a film of the polymer of a thickness of 3 to 7 mils by compression --.

Signed and sealed this 25th day of April 1961.

(SEAL)
Attest:

ERNEST W. SWIDER
Attesting Officer

DAVID L. LADD
Commissioner of Patents